(12) United States Patent
Malik et al.

(10) Patent No.: US 6,847,871 B2
(45) Date of Patent: Jan. 25, 2005

(54) CONTINUOUSLY MONITORING AND CORRECTING OPERATIONAL CONDITIONS IN AUTOMOBILES FROM A REMOTE LOCATION THROUGH WIRELESS TRANSMISSIONS

(75) Inventors: Nadeem Malik, Austin, TX (US); Charles Gorham Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 10/232,247

(22) Filed: Aug. 29, 2002

(65) Prior Publication Data

US 2004/0044453 A1 Mar. 4, 2004

(51) Int. Cl.$^7$ .............................. G06F 7/00; G06F 19/00
(52) U.S. Cl. .............................. 701/33; 701/24; 701/29; 701/30; 342/357.09; 455/423
(58) Field of Search .............................. 701/29, 30, 33, 701/24, 32; 455/418, 419, 423, 517, 457; 342/357.09; 340/539.17

(56) References Cited

U.S. PATENT DOCUMENTS 6,330,499 B1 * 12/2001 Chou et al. .................... 701/33
6,434,512 B1 * 8/2002 Discenzo .................... 702/184
6,611,739 B1 * 8/2003 Harvey et al. ................ 701/29

* cited by examiner

Primary Examiner—Gertrude A. Jeanglaude
(74) Attorney, Agent, or Firm—Jerry B. Kraft; Mark E. McBurney

(57) ABSTRACT

Continuously monitoring automobile operations, performance and operating conditions from the remote diagnostic centers through Continuous wireless transmissions so that faults may be immediately recognized and corrected or the operator warned or actions remotely initiated to limit or prevent damage or safety hazards. A plurality of sensing devices in said automobile; each device for respectively continuously sensing an operational parameter of the automobile; a wireless transmitter in the automobile for transmitting the continuously sensed parameters to a diagnostic station remote from automobile; apparatus in the diagnostic station for analyzing said parameters in order to determine defective operational conditions in the automobile; and apparatus associated eith said diagnostic station for wieless transmission of data relative to the determined defective operating conditions back to said automobile.

27 Claims, 4 Drawing Sheets

US 6,847,871 B2

CONTINUOUSLY MONITORING AND CORRECTING OPERATIONAL CONDITIONS IN AUTOMOBILES FROM A REMOTE LOCATION THROUGH WIRELESS TRANSMISSIONS

TECHNICAL FIELD

The present invention relates to telecommunications through mobile wireless transmission systems and particularly to the use of such systems to continuously monitor and correct operating conditions in the automobile by transmissions from remote locations.

BACKGROUND OF RELATED ART

With the globalization of business, industry and trade wherein transactions and activities within these fields have been changing from localized organizations to diverse transactions over the face of the world, the telecommunication industries have, accordingly, been expanding rapidly. Wireless telephones, such as cellular telephones, have become so pervasive that their world wide number is in the order of hundreds of millions. While the embodiment to be subsequently described uses cellular telephones as the example, the principles of the invention would be applicable to any wireless transmission device.

Despite the rapid expansion of and the proliferation of wireless telephones and particularly cellular telephones and networks, the industry is experiencing a decrease in consumer demand for wireless cellular telecommunications products. As a result, the industry is seeking new and expanded uses for its products. The present invention offers such an expanded application for wireless cellular telephone technology in the continuous monitoring and correction of automobile operating systems. The term automobile is meant to include any type of motor vehicle using public highways, e.g. trucks and cycles.

Over the last generation, the use of microprocessors and central processors in automobiles has been rapidly expanding. In addition to a central computer, referred to as the engine control unit, automobiles have upwards of fifty microprocessors dispersed throughout the automobile to control the sensing and controlling of many discrete operations. The increase in such microprocessors has been necessitated by the imposition of emission and fuel economy standards and safety standards, reduction in wiring, as well as advanced comfort and convenience features.

With all of this on-board data processing during automobile operations, increasing self-diagnostics have been built into the automobile wherein defects or faults are often self-adjusted within the automobile without any apparent effect on operations. Of course, with such complex operations, it may at times be the case that the on-board diagnostic system cannot adjust or correct the fault. Also, the fault may be mechanical, physical or electrical and require some form of manual repair. Accordingly, the automobile has a central storage module in which sensed data relative to faults and defects, particularly faults and defects that cannot be self-adjusted, is stored. Then, the automobile must visit a diagnostic and repair shop where the defects and stored data relative thereto are interpreted and the defect repaired. Alternatively, as described in U.S. Pat. No. 6,181,994, when a problem arises, the automobile may establish a wireless communication with a diagnostic center so that the particular problem may be analyzed and repaired.

SUMMARY OF THE PRESENT INVENTION

The present invention provides an advance over the above-discussed prior art that involves continuously monitoring automobile operations, performance and operating conditions from the remote diagnostic centers through continuous wireless transmissions so that faults may be immediately recognized and either corrected or the operator warned or actions remotely initiated to limit or prevent damage or safety hazards within the automobile operations.

Accordingly, the present invention provides a system for continuously monitoring and correcting operational conditions in an automobile that comprises a plurality of sensing devices in said automobile; each device for respectively continuously sensing an operational parameter of said automobile; a wireless transmitter in said automobile for transmitting said continuously sensed parameters to a diagnostic station remote from said automobile; apparatus in said diagnostic station for analyzing the sensed data in order to determine defective operational conditions in said automobile; and apparatus associated with said diagnostic station for wireless transmission of data relative to said determined defective operating conditions back to said automobile. The data transmitted back to said automobile may include data for selectively activating the apparatus already on-board the automobile for correcting the defective operational conditions. Whenever practical, apparatus for correcting said defective conditions corrects said conditions transparently to the operator of said automobile.

Where the automobile conventionally includes the plurality of embedded microprocessors for controlling automobile operations, the corrected defective operating conditions may be in these embedded microprocessors. The automobile may also include an output device for informing the automobile operator of the defective operating conditions, particularly dangerous operating conditions. Also, under such dangerous or potentially harmful conditions, there may be apparatus in said automobile for limiting the operation of the automobile in response to a determined defective operating condition.

As will be subsequently described in greater detail, the wireless transmission system used for the present invention may conveniently be wireless cellular telephonic systems.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
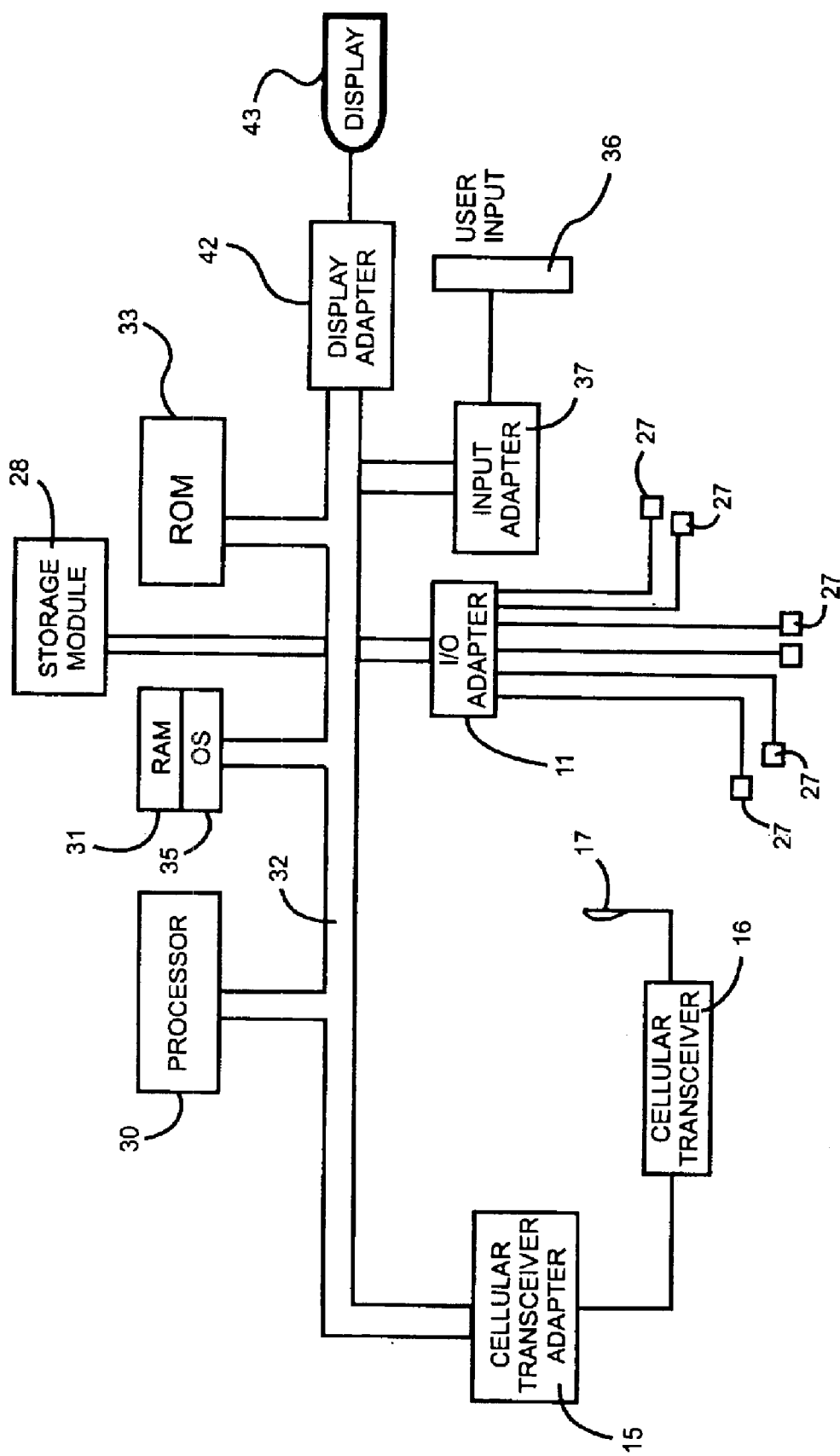
FIG. 1 is a block diagram of a generalized data processing system including a central processor unit that provides an illustration of an on-board automobile operations control system wirelessly connected to the diagnostic center in the present invention.

Referring to FIG. 1, there is provided a diagrammatic view of a typical computer control system that may function as an automobile on-board computer control for sensing various parameters and controlling the automotive operations and functions, including the previously described monitoring and control functions, as well as the apparatus for continuously transmitting to and from the remote diagnostic centers for analyzing and correcting operational defects and communicating and correcting such faults remotely through wireless cellular communications.

It should be understood that the actual illustrative parameters being sensed or the particular defects being corrected are not themselves specifically pertinent to the invention. However, what is pertinent is how they illustrate that defects in automobile operating conditions requiring advanced detection and correction by diagnostic and repair centers are detected and controlled on a real-time basis by continuous monitoring and transmissions between the automobile and the remote diagnostic centers via wireless communications. Embedded control units 27 are positioned in dozens of places throughout the automobile. Typically, such control units are combinations of sensors and microprocessors controlling activators to function as sensors in making minor adjustments to valves and gauges, etc., to maintain parameters within operational ranges. Control units 27 are connected via I/O adapter 11 to a central processing unit 30 that, in turn, is interconnected to various other components by system bus 32 and coordinates the operations. An operating system 35 that runs on processor 30 provides control and is used to coordinate the functions of the various components of the control system. The OS 35 is stored in Random Access Memory (RAM) 31; which, in a typical automobile control system, has from four to eight megabytes of memory. The programs for the various automobile monitor and control functions, including those of the present invention, are permanently stored in Read Only Memory (ROM) 33 and moved into and out of RAM to perform their respective functions. The automobile has a basic display 43 controlled through display adapter 42 to provide information to the driver, including the safety and other information from the remote diagnostic center, as will be subsequently described. The automobile operator may provide interactive commands to the automobile control system through a user input 36 that may conveniently be implemented by standard dashboard buttons connected via an appropriate input adapter 37.

The information from control units 27 is stored in a central storage unit 28 where it will be available for advanced diagnostics. In automobiles, there are programs available by which the central processing unit will analyze this stored information and then determine whether the time is appropriate for the automobile to be brought to a diagnostic and repair center to repair defective operating conditions. The system will then give the operator appropriate warning via display 43. In accordance with the present invention, the stored data in module 28 is wirelessly transmitted to a remote diagnostic center on a continuous or real time basis as will be subsequently described. During the operation of the automobile, this data is continuously transmitted via cellular transceiver adapter 15 to cellular transceiver 16 mounted within the automobile with antenna 17 over a wireless cellular telephone system that will be described in greater detail with respect to FIG. 2. A transceiver is basically any conventional wireless cellular (transmitting/receiving) telephone mounted in the automobile under the control of processor 30 and operating as will hereinafter be described.

Figure 2:
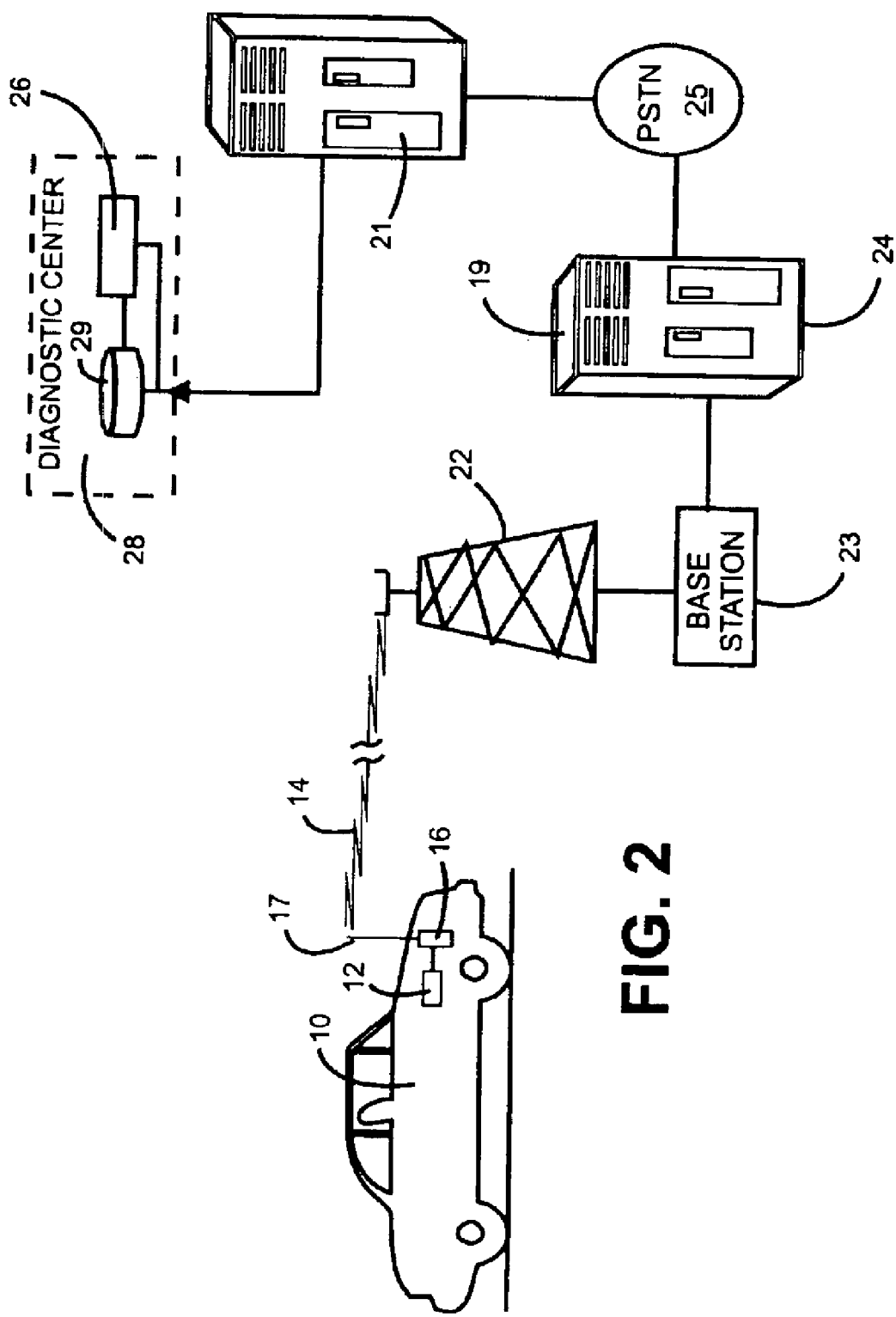
FIG. 2 is a generalized diagrammatic view of a portion of a wireless mobile cellular telecommunications network including a base station connected to a Public Switched Transmission Network (PSTN) showing the continuous transmission paths to and from automobile and diagnostic center in accordance with the invention.

In FIG. 2, automobile 10 has unit 12 that is representative of the whole control system shown in FIG. 1 transmitting through transceiver 16 via cellular signal 14 between antenna 17 and the nearest cellular tower 22.

At this point, some general background information on cellular telephone systems should be reviewed in order for the invention to be better understood.

In the cellular system for the handheld mobile wireless phone, an area such as a city is broken up into small area cells. Each cell is about ten square miles in area. Each has its base station that has a tower for receiving/transmitting and a base connected into PSTN. Even though a typical carrier is allotted about 800 frequency channels, the creation of the cells permit extensive frequency reuse so that tens of thousands of people in the city can be using their cell phones simultaneously. Cell phone systems are now preferably digital with each cell having over 160 available channels for assignment to users. In a large city, there may be hundreds of cells, each with its tower and base station. Because of the number of towers and users per carrier, each carrier has a Mobile Telephone Switching Office (MTSO) that controls all of the base stations in the city or region and controls all of the connections to the land based PSTN. When a client cell phone gets an incoming call, MTSO tries to locate what cell the client mobile phone is in. The MTSO then assigns a frequency pair for the call to the cell phone. The MTSO then communicates with the client over a control channel to tell the client or user what frequency channels to use. Once the user phone and its respective cell tower are connected, the call is on between the cell phone and tower via two-way long range RF communication. In the United States, cell phones are assigned frequencies in the 824–894 MHz ranges. Since transmissions between the cell telephone and cell tower are digital, but the speaker and microphone in the telephone are analog, the cell telephone has to have a D to A converter from the input to the phone speaker and an A to D converter from the microphone to the output to the cell tower.

Accordingly, with respect to FIG. 2, cellular transceiver 16 transmits and receives signals to and from towers 22 within the 824–894 MHz frequencies. Once appropriate contact is established with tower 22, the transmission would be conventional. The signals are passed through base station 23 to switching center 24 that then controls the routing of the call to a PSTN 25. The above-mentioned MTSO is associated with the switching center 24. The PSTN then, in the conventional cellular manner, routes the call through switching center 21 through wired connection to and from the remote Diagnostic Center 28 that comprises a data storage device 29 for the received data and conventional diagnostic means, i.e. a conventional diagnostic center except that it receives data transmitted wirelessly on a real-time basis and provides the corrective and informative data back to the automobile involving the path through switching centers 21 and 19, PSTN 25 and a cellular tower 22 back through transceiver 16.

Figure 3:
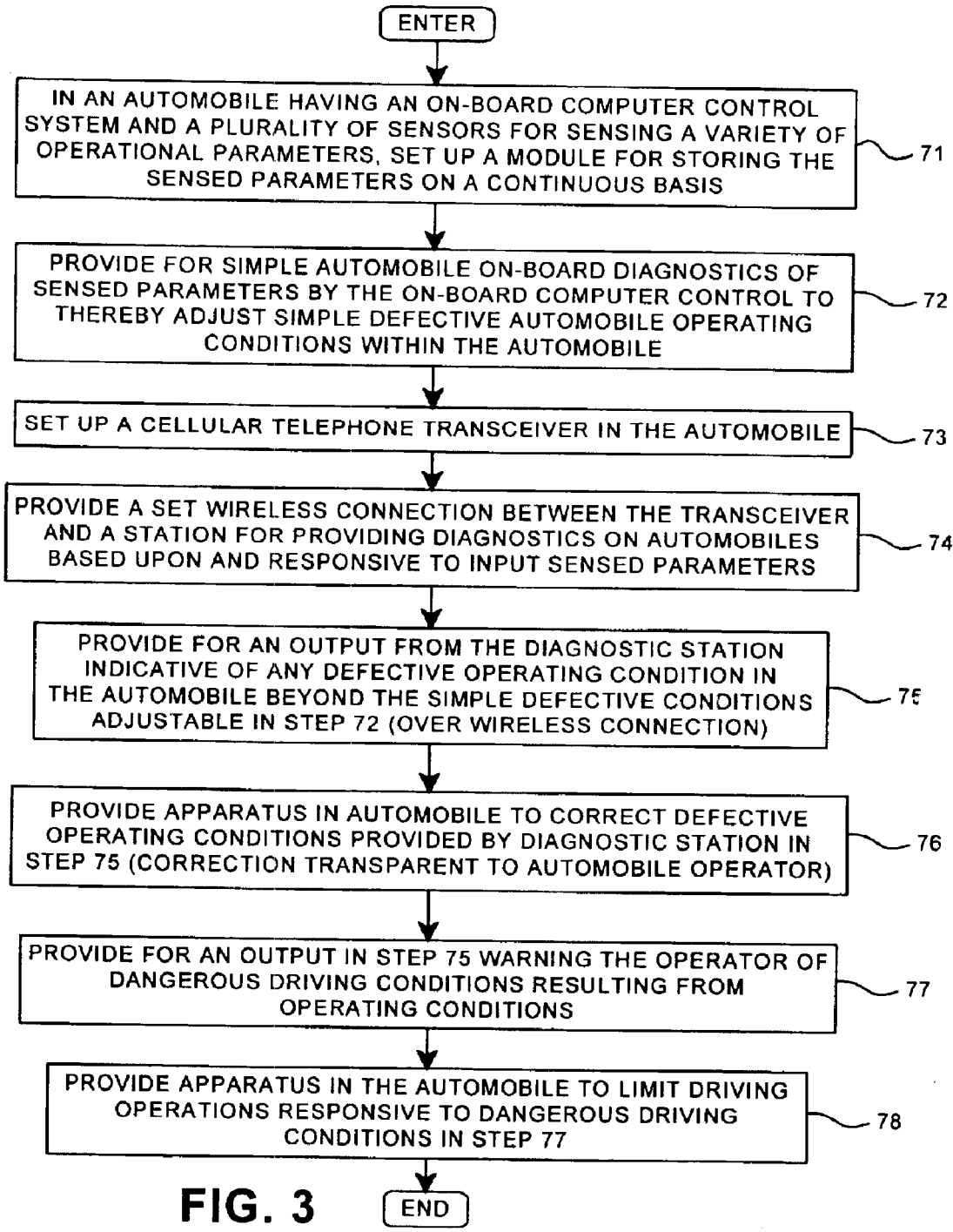
FIG. 3 is an illustrative flowchart describing the setting up of the elements needed for the program of the invention for continuously remotely monitoring and controlling automobile operations over a cellular telecommunications network.

Now, with reference to the programming shown in FIG. 3, there will be described how the system and programs of the present invention are set up. In an automobile having a standard on-board computer system and a plurality of conventional sensors for sensing a variety of operational parameters, there is set up a module for storing the sensed parameters on a continuous basis, step 71. Simpler on-board diagnostics are provided whereby sensed parameters are diagnosed by computer and microprocessor controls to thereby adjust simple defective automobile operating conditions within the automobile, step 72. A cellular telephone transceiver is set up in the automobile, step 73. A wireless connection is provided between the transceiver and a remote station that furnishes diagnostics on automobiles based upon and responsive to an input representative of the sensed parameters, step 74. The diagnostic center provides an output relative to any defective operating condition in the automobile beyond the simple defective conditions that were adjustable in step 72. This output is provided back to the automobile over the wireless path, step 75. Apparatus is provided, step 76, in the automobile to correct the defective operating conditions provided by the diagnostic center in step 75. The correction is preferably transparent to the operator, step 76. There is also an output provided in step 75 warning the operator of dangerous driving conditions, step 77, that may result from the sensed data provided to the diagnostic center alone or that information in combination with other information that the diagnostic center may get from independent sources, e.g. weather conditions. For example, in the case where the sensed defect is diminished traction; that alone may not pose an immediate danger. However, if the diagnostic center also becomes aware of potential wet weather conditions, it may issue an appropriate warning. Also, if the defect results in potentially dangerous driving conditions, the diagnostic center may transmit a wireless signal that will block or otherwise limit the operation of the automobile, step 78.

Figure 4:
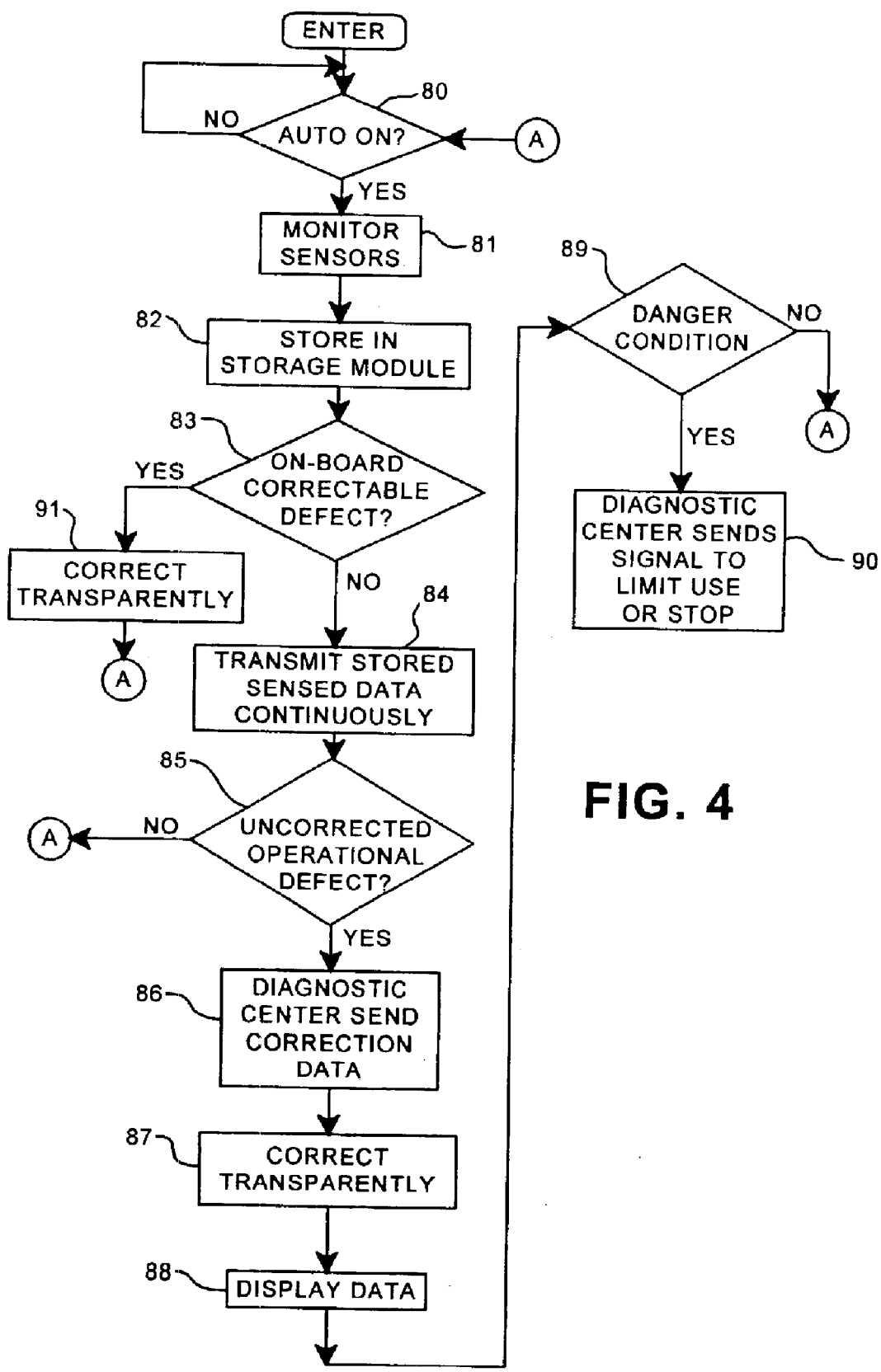
FIG. 4 is a flowchart of an illustrative simplified run of the program set up in FIG. 3.

Now, with reference to the flowchart of FIG. 4, a simplified illustrative run of the process set up in FIG. 3 will be described. A determination is made as to whether the automobile is on or being operated, step 80. If Yes, the sensors are monitored, step 81, and the sensed data is stored in the data storage module in the automobile, step 82. A determination may be made as to whether a particular defect is correctable by the onboard computer/microprocessor in the automobile, step 83. If Yes, the defect is corrected on-board, transparently to the operator if possible, step 91, and the sensing process is returned to step 80 via branch "A" and continued. If the decision in step 83 is No, the data is stored in the storage module and continuously transmitted to the remote diagnostics center, step 84. A determination is made as to whether there is an uncorrected defect that the diagnostic center can correct, step 85. If No, the sensing process is returned to step 80 via branch "A" and continued. If Yes, the diagnostic center transmits appropriate correction data back to the automobile, step 86, to preferably correct transparently, step 87, and if appropriate, data is displayed in the automobile, step 88. Also, the diagnostic center may determine whether there are any dangerous conditions, step 89. If No, the sensing process is returned to step 80 via branch "A" and continued. If Yes, the diagnostic center may send a signal to limit or stop the use of the automobile, step 90.

Although certain preferred embodiments have been shown and described, it will be understood that many changes and modifications may be made therein without departing from the scope and intent of the appended claims.

What is claimed is:

1. A system for continuously monitoring and correcting operational conditions in an automobile comprising:
   a plurality of sensing devices in said automobile each device for respectively continuously sensing an operational parameter of said automobile;
   a wireless transmitter in said automobile for transmitting said continuously sensed parameters to a diagnostic station remote from said automobile;
   apparatus in said diagnostic station for analyzing said parameters in order to determine defective operational conditions in said automobile; and
   apparatus associated with said diagnostic station for wireless transmission of data relative to said determined defective operating conditions back to said automobile.

2. The system for monitoring and correcting operational conditions of claim 1 wherein:
   said automobile further includes apparatus for correcting said defective operational conditions; and
   said data transmitted back to said automobile includes data for activating said apparatus for correcting said defective operational conditions.

3. The system for monitoring and correcting operational conditions of claim 2 wherein said apparatus for correcting said defective conditions corrects said conditions transparently to the operator of said automobile.

4. The system for monitoring and correcting operational conditions of claim 2 wherein:
   said automobile includes a plurality of embedded data processors for controlling automobile operations; and
   said defective operating conditions are defects within said embedded data processors.

5. The system for monitoring and correcting operational conditions of claim 1 further including an output device for informing the automobile operator of said defective operating conditions.

6. The system for monitoring and correcting operational conditions of claim 5 wherein said output device includes a display.

7. The system for monitoring and correcting operational conditions of claim 5 wherein said output device is enabled to inform the operator of dangerous operating conditions.

8. The system for monitoring and correcting operational conditions of claim 5 further including apparatus in said automobile for limiting the operation of the automobile in response to a determined defective operating condition.

9. The system for monitoring and correcting operational conditions of claim 2 wherein:
   said wireless transmitter in said automobile is a wireless cellular telephonic device; and
   said apparatus for wireless transmission of data relative to determined defective operating conditions back to the automobile includes a wireless cellular telephonic device.

10. A method for continuously monitoring and correcting operational conditions in an automobile comprising:
    continuously sensing a plurality of operational parameters of said automobile;
    wirelessly transmitting said continuously sensed parameters to a diagnostic station remote from said automobile;
    analyzing said parameters in said diagnostic station in order to determine defective operational conditions in said automobile; and
    wirelessly transmitting data relative to said determined defective operating conditions from said diagnostic station back to said automobile.

11. The method for monitoring and correcting operational conditions of claim 10 including the step of correcting said defective operational conditions in said automobile responsive to said data transmitted back to said automobile.

12. The method for monitoring and correcting operational conditions of claim 11 wherein said defective conditions are corrected transparently to the operator of said automobile.

13. The method for monitoring and correcting operational conditions of claim 11 wherein:
    said automobile includes a plurality of embedded data processors for controlling automobile operations; and
    said defective operating conditions being corrected are defective operating conditions of said embedded data processors.

14. The method for monitoring and correcting operational conditions of claim 10 further including the step of informing the automobile operator of said defective operating conditions.

15. The method for monitoring and correcting operational conditions of claim 14 wherein said defective operating conditions are displayed to inform the automobile operator.

16. The method for monitoring and correcting operational conditions of claim 14 wherein said step of informing said automobile operator is enabled to inform the operator of dangerous operating conditions.

17. The method for monitoring and correcting operational conditions of claim 14 further including the step of limiting the operation of the automobile in response to a determined defective operating condition.

18. The method for monitoring and correcting operational conditions of claim 11 wherein:

said wirelessly transmitting from said automobile includes a wireless cellular telephonic transmission; and said wireless transmission of data relative to determined defective operating conditions back to the automobile includes a wireless cellular telephonic transmission.

19. A computer program having code recorded on a computer readable medium for continuously monitoring and correcting operational conditions in an automobile comprising:

means in said automobile continuously sensing each of a plurality of operational parameters of said automobile;

means in said automobile for transmitting said continuously sensed parameters to a diagnostic station remote from said automobile;

means in said diagnostic station for analyzing said parameters in order to determine defective operational conditions in said automobile; and means associated with said diagnostic station for wireless transmission of data relative to said determined defective operating conditions back to said automobile.

20. The computer program for monitoring and correcting operational conditions of claim 19 wherein:

said automobile further includes means for correcting said defective operational conditions; and said data transmitted back to said automobile includes data for activating said means for correcting said defective operational conditions.

21. The computer program for monitoring and correcting operational conditions of claim 20 wherein said means for correcting said defective conditions corrects said conditions transparently to the operator of said automobile.

22. The computer program for monitoring and correcting operational conditions of claim 20 wherein:

said automobile includes a plurality of embedded data processors for controlling automobile operations; and said defective operating conditions are defects within in said embedded data processors.

23. The computer program for monitoring and correcting operational conditions of claim 19 further including an output device for informing the automobile operator of said defective operating conditions.

24. The computer program for monitoring and correcting operational conditions of claim 23 wherein said output device includes a display.

25. The computer program for monitoring and correcting operational conditions of claim 23 wherein said output device is enabled to inform the operator of dangerous operating conditions.

26. The computer program for monitoring and correcting operational conditions of claim 23 further including means in said automobile for limiting the operation of the automobile in response to a determined defective operating condition.

27. The computer program for monitoring and correcting operational conditions of claim 20 wherein:

said means for transmitting in said automobile is by wireless cellular telephonic transmission; and said means of wireless transmission of data relative to determined defective operating conditions includes wireless cellular telephonic transmissions.

* * * * *